(12) United States Patent
Brockway et al.

(10) Patent No.: US 9,096,396 B2
(45) Date of Patent: Aug. 4, 2015

(54) FLUIDIZATION AND ALIGNMENT ELBOW

(75) Inventors: Robert L. Brockway, Rutland, MA (US); Michael Barcelona, Leominster, MA (US); Michael Johnson, Worcester, MA (US); Brian Ledoux, Charlton, MA (US); Diego Mier-Casares, Worcester, MA (US)

(73) Assignee: Babcock Power Services, Inc., Worcester, MA (US)

( * ) Notice: Subject to any disclaimer, the term of this patent is extended or adjusted under 35 U.S.C. 154(b) by 435 days.

(21) Appl. No.: 13/493,817

(22) Filed: Jun. 11, 2012

(65) Prior Publication Data

US 2013/0330134 A1 Dec. 12, 2013

(51) Int. Cl.
*B65G 51/18* (2006.01)
*B65G 53/18* (2006.01)

(52) U.S. Cl.
CPC .................................... *B65G 53/18* (2013.01)

(58) Field of Classification Search
USPC ............ 406/89, 93, 94, 95, 181, 195; 138/42, 138/43
See application file for complete search history.

(56) References Cited

U.S. PATENT DOCUMENTS

| 2,498,218 | A |   | 2/1950  | Nielsen |         |
|-----------|---|---|---------|---------|---------|
| 3,559,694 | A | * | 2/1971  | Volberg | 138/147 |
| 3,562,402 | A | * | 2/1971  | Dwyer   | 174/373 |
| 3,791,320 | A |   | 2/1974  | Gidick  |         |
| 3,934,522 | A |   | 1/1976  | Booker  |         |
| 3,950,144 | A |   | 4/1976  | Gillette |        |
| 4,002,535 | A |   | 1/1977  | Albright et al. |   |
| 4,017,269 | A |   | 4/1977  | Dutz et al. |       |
| 4,131,072 | A |   | 12/1978 | Lingl, Jr. et al. | |
| 4,152,110 | A |   | 5/1979  | Jukkola et al. |    |
| 4,247,366 | A |   | 1/1981  | Knappstein et al. | |
| 4,274,343 | A |   | 6/1981  | Kokkinos |         |
| 4,356,063 | A |   | 10/1982 | Corry |            |
| RE31,572  | E |   | 5/1984  | Coulter et al. |   |
| 4,611,543 | A |   | 9/1986  | Collette |         |
| 4,641,864 | A |   | 2/1987  | Heine et al. |     |
| 4,865,353 | A |   | 9/1989  | Osborne |          |

(Continued)

FOREIGN PATENT DOCUMENTS

| CN | 201580809 U | 9/2010 |
| CN | 202193451 U | 4/2012 |

(Continued)

OTHER PUBLICATIONS

FLSmidth: "Fuller Airslide Conveying Technology" 2009 Publication.

(Continued)

*Primary Examiner* — Joseph Dillon, Jr.
(74) *Attorney, Agent, or Firm* — Locke Lord LLP; Joshua L. Jones; Alicia J. Esposito

(57) ABSTRACT

An elbow for a solid particle conveyance system includes an elbow body having an inlet duct and an outlet duct with an interior space defined between the inlet and outlet ducts. An aeration insert is mounted to the elbow body for aerating solid particles passing through the interior space of the elbow body. The aeration insert is mounted to the elbow body to provide aeration from an elevation between that of the inlet duct and the outlet duct to facilitate downward movement of solid particles from the inlet duct across the aeration insert, and out through the outlet duct.

16 Claims, 3 Drawing Sheets

(56) References Cited

U.S. PATENT DOCUMENTS

| | | | |
|---|---|---|---|
| 4,934,284 A | 6/1990 | Nitz et al. | |
| 5,139,673 A * | 8/1992 | Martin | 210/463 |
| 5,241,979 A * | 9/1993 | Chang | 137/247.41 |
| 5,598,889 A * | 2/1997 | Jackson | 165/95 |
| 6,089,171 A | 7/2000 | Fong et al. | |
| 6,840,183 B2 | 1/2005 | Wark | |
| 8,328,168 B1 * | 12/2012 | Marston | 261/121.1 |
| 2002/0189212 A1 * | 12/2002 | Hettmann | 55/337 |
| 2003/0209470 A1 | 11/2003 | Wark | |
| 2004/0168958 A1 * | 9/2004 | Eggleston | 210/95 |
| 2005/0258285 A1 * | 11/2005 | McCambridge et al. | 241/2 |
| 2007/0297881 A1 | 12/2007 | Magaldi | |
| 2009/0003942 A1 | 1/2009 | Salmento et al. | |
| 2009/0010720 A1 | 1/2009 | Schwartz et al. | |
| 2009/0178338 A1 | 7/2009 | Leininger et al. | |
| 2010/0132344 A1 * | 6/2010 | Peters | 60/299 |
| 2010/0176218 A1 * | 7/2010 | Carpenter | 239/310 |
| 2012/0301231 A1 * | 11/2012 | Jagow et al. | 406/183 |
| 2013/0081993 A1 * | 4/2013 | Freakes | 210/351 |
| 2013/0164182 A1 * | 6/2013 | Iijima et al. | 422/169 |
| 2013/0164183 A1 * | 6/2013 | Iijima et al. | 422/170 |
| 2013/0295837 A1 * | 11/2013 | Bailey | 454/356 |
| 2013/0334810 A1 * | 12/2013 | Crary | 285/31 |
| 2013/0340163 A1 * | 12/2013 | Ball et al. | 4/679 |
| 2014/0097145 A1 * | 4/2014 | Browning | 210/780 |
| 2014/0196444 A1 * | 7/2014 | Watahiki et al. | 60/297 |

FOREIGN PATENT DOCUMENTS

| | | |
|---|---|---|
| EP | 0693578 A1 | 1/1996 |
| GB | 607009 A | 8/1948 |
| JP | S61130521 U | 8/1986 |
| JP | 2005036876 A | 2/2005 |

OTHER PUBLICATIONS

Search Report under Section 17 dated Nov. 21, 2013 for United Kingdom Application No. GB 1310347.8.

* cited by examiner

FLUIDIZATION AND ALIGNMENT ELBOW

BACKGROUND OF THE INVENTION

1. Field of the Invention

The present invention relates to elbows in duct systems such as for solid particle conveyors, and more particularly to fluidization elbows.

2. Description of Related Art

Fluidization conveyors allow for solid materials to be transferred through a chute from one point to another without the need for a traditional belt conveyor system. A belt conveyor would not be desired in certain cases due to the density of material, corrosive nature, or temperature of material desired to be transferred. Fluidization conveyors by contrast, eliminate the need for moving parts to be in contact with the material being transferred and instead use an airflow through the material to fluidize the material and allow for gravity to move the material through the conveyor system.

In a fluidization conveyor system, straight line runs from one point to another are not always possible to design due to pre-existing mechanical structures or the like. Therefore, one or more elbows are required to route the conveyor around a worksite.

Such conventional methods and systems have generally been considered satisfactory for their intended purpose. However, there is still a need in the art for a fluidization elbow that allows for improved directional and alignment of a fluidization conveyor system while reducing build up of material in the elbow to reduce wear of the fluidization conveyor. There also remains a need in the art for such a fluidization elbow that is easy to make and use. The present invention provides a solution for these problems.

SUMMARY OF THE INVENTION

The subject invention is directed to a new and useful elbow for a solid particle conveyance system. The elbow includes an elbow body having an inlet duct and an outlet duct with an interior space defined between the inlet and outlet ducts. An aeration insert is mounted to the elbow body for aerating solid particles passing through the interior space of the elbow body. The aeration insert is mounted to the elbow body to provide aeration from an elevation between that of the inlet duct and the outlet duct to facilitate downward movement of solid particles from the inlet duct across the aeration insert, and out through the outlet duct.

In certain embodiments, an interior space is defined between the inlet and outlet ducts, with a lower access port defined on the elbow body into the interior space. A base flange can be mounted to the lower access port of the elbow body. A riser can extend from the base flange into the interior space of the elbow body. An aeration membrane can be mounted to the riser opposite the base flange, wherein the aeration membrane is disposed at a height between that of the inlet duct and the outlet duct.

In certain embodiments, an aeration insert is mounted in the inlet duct for aerating solid particles passing into the elbow. An aeration insert can be mounted in the outlet duct for aerating solid particles passing out of the elbow.

In accordance with certain embodiments, the inlet duct and outlet duct are different sizes from one another. The inlet duct and outlet duct can be angled with respect to one another in a common plane, for example to connect between two ducts that are angled relative to one another. The inlet duct and outlet duct can be angled with respect to one another about a vertical axis and in elevation. The inlet duct and outlet duct can be arranged in a fixed position with respect to one another.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
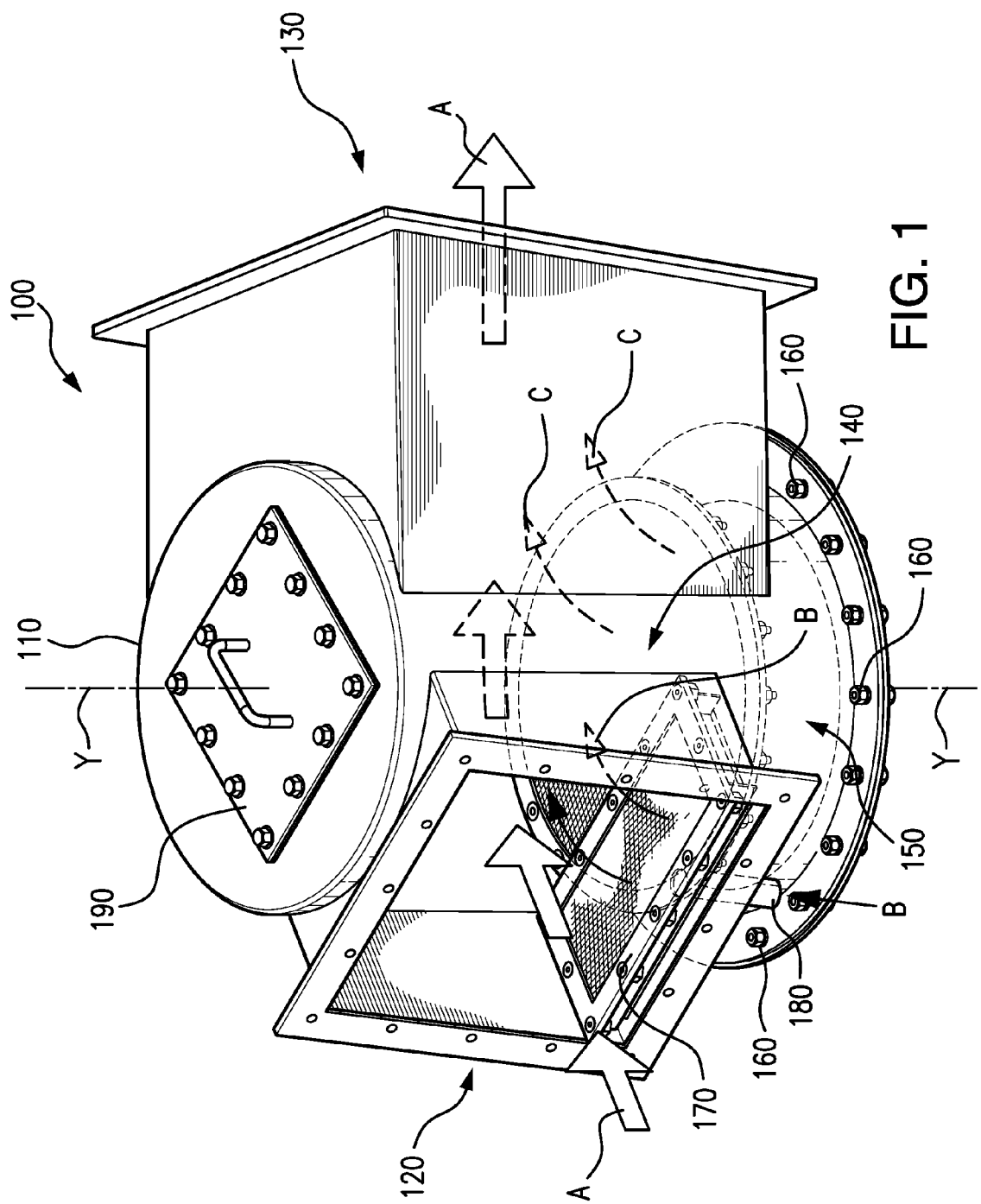
FIG. 1 is a perspective schematic view of an exemplary embodiment of an elbow for a solid particle conveyance system constructed in accordance with the present invention, showing an inlet aeration insert mounted in the inlet duct and a main aeration insert in the interior space.

Reference will now be made to the drawings wherein like reference numerals identify similar structural features or aspects of the subject invention. For purposes of explanation and illustration, and not limitation, a partial view of an exemplary embodiment of an elbow for a solid particle conveyance system in accordance with the invention is shown in FIG. 1 and is designated generally by reference character 100. Other embodiments of elbows in accordance with the invention, or aspects thereof, are provided in FIGS. 2-4, as will be described. The system of the invention can be used to transport aerated solid particles through a solid particle conveyance system.

Referring to FIG. 1, elbow 100 for a solid particle conveyor system is shown. Elbow 100 includes an elbow body 110 having an inlet duct 120 and an outlet duct 130 with an interior space 140 defined between inlet duct 120 and outlet duct 130. A main aeration insert 150 is mounted to the elbow body for aerating solid particles passing through the interior space 140 of the elbow body 110. Aeration insert 150 is mounted to the elbow body 110 by bolts 160. For ease of visibility, not all bolts 160 are marked in the figures. In an exemplary embodiment, inlet aeration insert 170 is positioned within inlet duct 120 for aerating solid particles passing into the elbow in the direction of Arrows A. Arrows B shows the direction of the aeration air supplied at air inlet tube 180. Optionally, a similar aeration insert 170 can be mounted in outlet duct 130 for aerating solid particles passing out of elbow 100. Access port 190 is provided for ease of access to the interior space of elbow body 110 for cleaning or maintenance of elbow 100.

Figure 2:
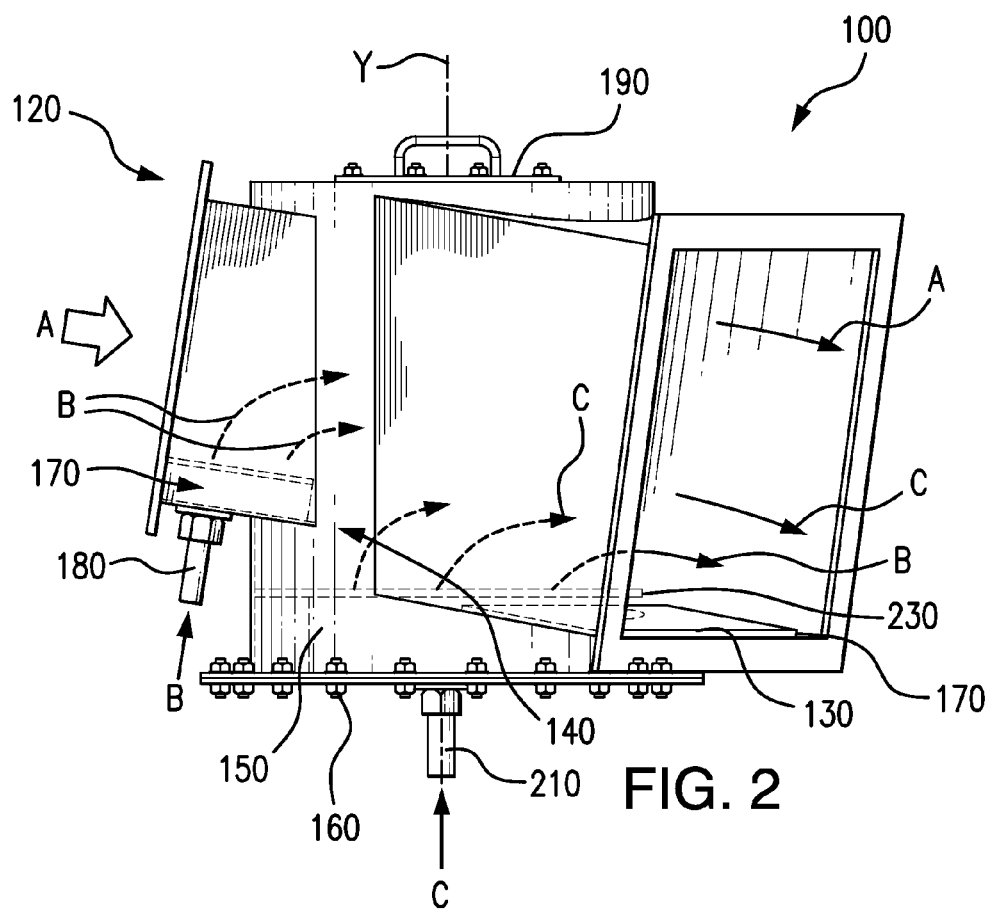
FIG. 2 is a side elevation schematic view of the elbow of FIG. 1, showing the angled inlet and outlet ducts in conjunction with the mounted aeration inserts.

Referring now to FIG. 2, main aeration insert 150 provides aeration (arrows C) through air inlet tube 210 from an elevation between that of the bottoms of inlet duct 120 and outlet duct 130 to facilitate downward movement of solid particles from inlet duct 120 across main aeration insert 150, and out through outlet duct 130. Inlet duct 120 and outlet duct 130 are different sizes from one another, however they can be identical in size if appropriate. To further assist in facilitating downward movement of solid particles, inlet duct 120 and outlet duct 130 are angled with respect to one another about a vertical axis Y (defined by the cylinder of elbow body 110) and are also angled in elevation relative to one another. Also, inlet duct 120 and outlet duct 130 are arranged in a fixed position with respect to one another eliminate the need for complex plate work at the connection that would otherwise be required to correct for the compound angles created by the geometry. The components of inlet duct 120 and outlet duct 130 can be joined to elbow body 110, for example by welding.

Figure 3:
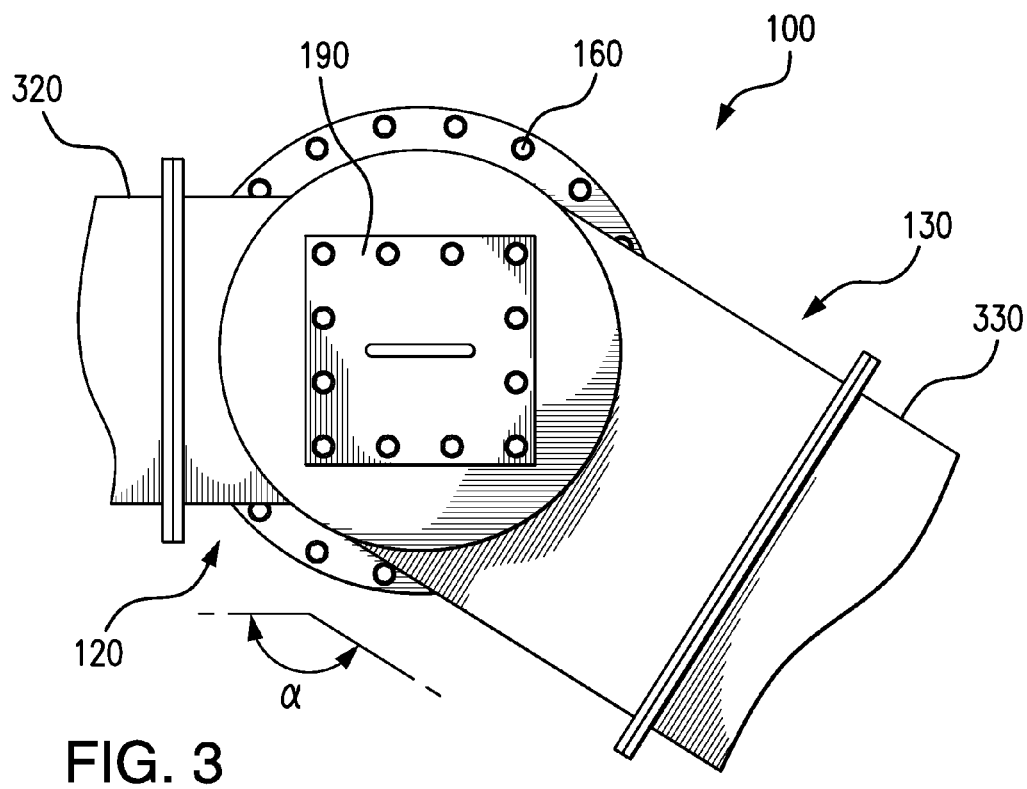
FIG. 3 is a top plan view of the elbow of FIG. 1, showing the fixed angle of the inlet and outlet ducts connected to straight line segments of a fluidization conveyor system.

Referring now to FIG. 3, when connected to a fluidization system, a first conduit 320 and second conduit 330 are attached to corresponding inlet duct 120 and outlet duct 130. Angle α shows the elbow turn angle from inlet section 320 to outlet section 330 relative to the vertical axis. Optionally, inlet duct 120 and outlet duct 130 can be angled with respect to one another in a common plane (e.g. a horizontal plane) which provides a connection between two horizontal conduits.

Figure 4:
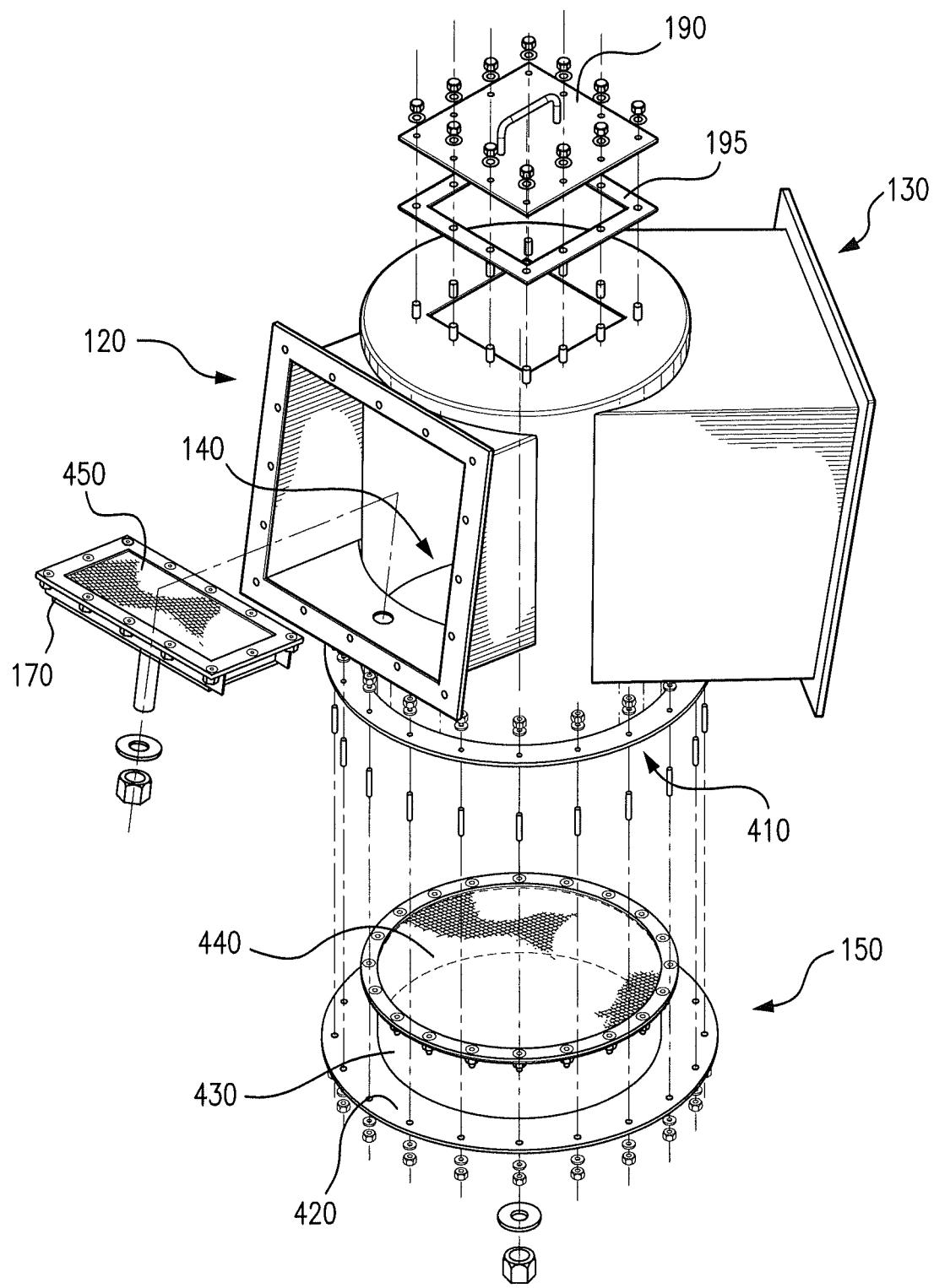
FIG. 4 is an exploded schematic perspective view of the elbow of FIG. 1, showing the manner of attachment of the aeration inserts to the elbow.

With reference to FIG. 4, elbow body 110 includes interior space 140 defined between inlet duct 120 and outlet duct 130, with lower access port 410 defined on elbow body 110 leading into interior space 140. Inlet aeration insert 170 is mounted in the inlet duct of the elbow body for aerating solid particles passing into the interior space of the elbow body. Inlet aeration insert 170 includes aeration membrane 450. With reference to main aeration insert 150, base flange 420 is mounted to lower access port 410 of elbow body 110. Riser 430 extends from base flange 420 into interior space 140 of elbow body 110. Aeration membrane 440 is mounted to riser 430 opposite base flange 420, such that aeration membrane 440 is disposed at a height between that of inlet duct 120 and outlet duct 130. Particles entering inlet duct 120 can move downward with gravity to aeration membrane 440 and then downward again to outlet duct 130. In this way, there is no buildup of particles on aeration membrane 440.

When it becomes necessary to remove or service main aeration insert 150, removal of bolts 160 allows easy access to aeration membrane 440, which remains in a fixed position connected to riser 430 during removal of main aeration insert 150. In this regard, removal of aeration insert 150 does not necessitate removal of aeration membrane 440 from riser 430 and thereby facilitates installation and removal of aeration insert 150. The fact that there is no particle buildup on main aeration insert 150 due to the elevation change described above, removal of main aeration insert 150 is facilitated because there is no need to remove accumulated particles prior to removal of main aeration insert 150.

The methods and systems of the present invention, as described above and shown in the drawings, provide an elbow for a solid particle conveyance system with superior properties including downward movement of solid particles from an inlet duct across an aeration insert, and out through an outlet duct. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. An elbow for a solid particle conveyance system comprising:

an elbow body having an inlet duct and an outlet duct with an interior space defined between the inlet and outlet ducts; and an aeration insert mounted to the elbow body for aerating solid particles passing through the interior space of the elbow body, wherein the aeration insert is mounted to the elbow body to provide aeration from an elevation along a vertical axis between that of the bottom of the inlet duct and the bottom of the outlet duct to facilitate downward movement of solid particles from the inlet duct across the aeration insert, and out through the outlet duct.

2. An elbow as recited in claim 1, wherein the aeration insert further includes:

a base flange mounted to a lower access port of the elbow body;

a riser extending from the base flange into the interior space of the elbow body; and an aeration membrane mounted to the riser opposite the base flange, wherein the aeration membrane is disposed at a height between that of the inlet duct and the outlet duct.

3. An elbow as recited in claim 1, further comprising an aeration insert mounted in the inlet duct for aerating solid particles passing into the elbow.

4. An elbow as recited in claim 1, further comprising an aeration insert mounted in the outlet duct for aerating solid particles passing out of the elbow.

5. An elbow as recited in claim 1, wherein the inlet duct and outlet duct are different sizes from one another.

6. An elbow as recited in claim 1, wherein the inlet duct and outlet duct are angled with respect to one another in a common plane.

7. An elbow as recited in claim 1, wherein the inlet duct and outlet duct are angled with respect to one another about the vertical axis and in elevation.

8. An elbow as recited in claim 1, wherein the inlet duct and outlet duct are arranged in a fixed position with respect to one another.

9. An elbow for a solid particle conveyance system comprising:

an elbow body having an inlet duct and an outlet duct with an interior space defined between the inlet and outlet ducts, with a lower access port defined on the elbow body into the interior space;

an aeration insert mounted in the inlet duct of the elbow body for aerating solid particles passing into the interior space of the elbow body;

a base flange mounted to the lower access port at an elevation below both the inlet duct and the outlet duct;

a riser extending from the base flange into the interior space of the elbow body; and an aeration membrane mounted to the riser opposite to the base flange to provide aeration from an elevation along a vertical axis between that of the bottom of the inlet duct and the bottom of the outlet duct to facilitate downward movement of solid particles from the inlet duct across the aeration membrane, and out through the outlet duct.

10. An elbow as recited in claim 9, further comprising an aeration insert mounted to the lower access port for aerating solid particles passing through the elbow.

11. An elbow as recited in claim 9, further comprising an aeration insert mounted in the outlet duct for aerating solid particles passing through the elbow.

12. An elbow as recited in claim 9, wherein the inlet duct and outlet duct are different sizes from one another.

13. An elbow as recited in claim 9, wherein the inlet duct and outlet duct are angled with respect to one another in a common plane.

14. An elbow as recited in claim 9, wherein the inlet duct and outlet duct are angled with respect to one another about the vertical axis and in elevation.

15. An elbow as recited in claim 9, wherein the inlet duct and outlet duct are arranged in a fixed position with respect to one another.

16. An elbow as recited in claim 1, wherein the aeration insert in mounted in the inlet duct for aerating solid particles passing into the elbow.

\* \* \* \* \*